(12) United States Patent
Ichikawa

(10) Patent No.: US 8,960,392 B2
(45) Date of Patent: Feb. 24, 2015

(54) VEHICLE

(75) Inventor: Shinji Ichikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 188 days.

(21) Appl. No.: 13/375,511

(22) PCT Filed: Nov. 26, 2009

(86) PCT No.: PCT/JP2009/069902
§ 371 (c)(1),
(2), (4) Date: Dec. 1, 2011

(87) PCT Pub. No.: WO2011/064855
PCT Pub. Date: Jun. 3, 2011

(65) Prior Publication Data
US 2012/0228420 A1 Sep. 13, 2012

(51) Int. Cl.
*H02G 11/02* (2006.01)
*B60K 6/445* (2007.10)
*B60L 11/12* (2006.01)
*B60L 11/14* (2006.01)
*B60L 11/18* (2006.01)
*B60R 16/02* (2006.01)

(52) U.S. Cl.
CPC ............... *B60K 6/445* (2013.01); *B60L 11/123* (2013.01); *B60L 11/14* (2013.01); *B60L 11/1818* (2013.01); *B60R 16/0215* (2013.01); *B60L 2210/10* (2013.01); *B60L 2210/40* (2013.01); *B60L 2220/14* (2013.01); *B60L 2230/12* (2013.01); *B60Y 2400/214* (2013.01); *Y02T 10/6217* (2013.01); *Y02T 10/6239* (2013.01); *Y02T 10/6269* (2013.01); *Y02T 10/7005* (2013.01); *Y02T 10/7077* (2013.01); *Y02T 10/7094* (2013.01); *Y02T 90/121* (2013.01); *Y02T 90/127* (2013.01); *Y02T 90/14* (2013.01); *Y02T 10/7241* (2013.01); *Y02T 10/7216* (2013.01)
USPC .......................................................... 191/12.4

(58) Field of Classification Search
CPC ....... H02G 11/00; H02G 11/02; B65H 75/00; B65H 75/4481; B65H 75/4484; B65H 75/4486; B65H 75/48
USPC ............... 191/12 R, 12.2 R, 12.4; 242/378.1, 242/388.1, 396.2, 396.4, 403, 405
See application file for complete search history.

(56) References Cited

U.S. PATENT DOCUMENTS 5,855,262 A * 1/1999 Jackson ....................... 191/12.4

FOREIGN PATENT DOCUMENTS

JP  A-2000-255248  9/2000
JP  A-2003-244832  8/2003

(Continued)

OTHER PUBLICATIONS

International Search Report issued in International Patent Application No. PCT/JP2009/069902 dated Jan. 12, 2010.

*Primary Examiner* — R. J. McCarry, Jr.
(74) *Attorney, Agent, or Firm* — Oliff PLC

(57) ABSTRACT

A hybrid car is a vehicle capable of being externally charged through a charging cable. The hybrid car includes a front door opened and closed when an occupant gets into and out of a vehicle cabin, and a cable reel mounted within the front door for taking up the charging cable. The front door has a resin portion located above the cable reel. A pull-out opening directed to the resin portion for pulling out the charging cable is formed in the cable reel. A take-out opening for taking out the charging cable pulled out from the pull-out opening from the front door to outside of the vehicle is formed in the resin portion. This configuration can improve workability during charging.

4 Claims, 6 Drawing Sheets

(56) References Cited

FOREIGN PATENT DOCUMENTS

| JP | 2004196209 | * | 7/2004 | ................ B60R 1/12 |
| JP | A-2004-196209 | | 7/2004 | |
| JP | A-2009-112076 | | 5/2009 | |
| JP | A-2003-219511 | | 7/2011 | |

* cited by examiner

TO BATTERY SIDE

VEHICLE

TECHNICAL FIELD

The present invention generally relates to a vehicle, and more specifically to a vehicle equipped with a charging cable for supplying electric power from an external power source to a vehicle main body.

BACKGROUND ART

For conventional vehicles, for example, Japanese Patent Laying-Open No. 2003-244832 discloses an electric car directed to reducing a space for accommodating a charging cord and suppressing generation of heat from the cord during charging (PTL 1). The electric car disclosed in PTL 1 is equipped with a take-up cord used as a cord for charging a battery.

In addition, Japanese Patent Laying-Open No. 2009-112076 discloses a vehicular charging port structure directed to easily connecting a power source external to a vehicle and a battery mounted in the vehicle (PTL 2). The vehicular charging port structure disclosed in PTL 2 is mounted in a plug-in hybrid car having a battery that can be charged by an external power source. The plug-in hybrid car includes a charging plug, a charging wire harness electrically connecting between the charging plug and the battery, and a take-up reel for taking up the charging wire harness. The take-up reel is provided on a vehicle side surface of the plug-in hybrid car.

Further, Japanese Patent Laying-Open No. 2000-255248 discloses a vehicular warming device directed to preventing social losses such as accidents resulting from coldness and reducing warm-up operation for prevention of pollution (PTL 3). In the vehicular warming device disclosed in PTL 3, a reel for taking up a cable is provided within a bumper at the rear of a car. The cable pulled out from the reel is connected to an external power source, and thereby electrical energy is introduced into a warm-up operation control circuit of a vehicle.

CITATION LIST

Patent Literature

PTL 1: Japanese Patent Laying-Open No. 2003-244832
PTL 2: Japanese Patent Laying-Open No. 2009-112076
PTL 3: Japanese Patent Laying-Open No. 2000-255248

SUMMARY OF INVENTION

Technical Problem

Recently, hybrid cars which use both a motor and an engine to drive wheels have been attracting attention as environmentally-friendly cars. Configuring such hybrid cars to be externally chargeable has been under consideration. In this case, by performing charging using a household power source and the like, a driver will have to go to a gas station for fuel supply less frequently, which will be convenient for the driver. It is also conceivable that hybrid cars configured as described above will be economically viable by utilizing inexpensive midnight electric power and the like.

On the other hand, the vehicles described in the above PTLs 1 to 3 are each equipped with a reel for taking up a charging cable for use during charging such that the vehicle is always provided with the charging cable. An operator pulls out the charging cable from the reel and connects the charging cable to an external power source, and thereby electric power is supplied to a vehicle main body. However, depending on the position on the vehicle from which the charging cable is taken out, the charging cable cannot be pulled out smoothly, which may impair workability during charging.

Therefore, one object of the present invention is to solve the aforementioned problem, and to provide a vehicle excellent in workability during charging.

Solution to Problem

A vehicle according to the present invention is a vehicle capable of being externally charged through a charging cable. The vehicle includes a door portion opened and closed when an occupant gets into and out of a vehicle cabin, and a cable reel mounted within the door portion for taking up the charging cable. The door portion has an upper portion located above the cable reel. A pull-out opening directed to the upper portion for pulling out the charging cable is formed in the cable reel. A take-out opening for taking out the charging cable pulled out from the pull-out opening from the door portion to outside of the vehicle is formed in the upper portion.

According to the vehicle configured as described above, the pull-out opening directed to the upper portion of the door portion is formed in the cable reel, and the take-out opening is formed in the upper portion of the door portion. Thus, the take-out opening is arranged at a position to which the charging cable pulled out from the pull-out opening extends, which facilitates pulling-out of the charging cable. Thereby, workability during charging of the vehicle can be improved.

Preferably, the vehicle further includes a seat portion which is installed in the vehicle cabin to be adjacent to the door portion and on which the occupant sits. The cable reel has a weight portion including a metal component. The weight portion is arranged at a position overlapping the seat portion when the door portion is viewed from front of the door portion. According to the vehicle configured as described above, an excessive load due to the weight portion can be suppressed from being exerted on the occupant when the vehicle is hit on the side.

Preferably, the door portion has a window glass capable of being opened and closed, a resin portion installed adjacent to the window glass in a front-rear direction of the vehicle and formed of resin, and a main body portion having a shape of a bag which can accommodate the window glass in an opened state and constituting a side body of the vehicle. The cable reel is mounted in the main body portion. The upper portion in which the take-out opening is formed is the resin portion. According to the vehicle configured as described above, the main body portion is effectively utilized as a place in which the cable reel is arranged, and the resin portion installed adjacent to the window glass is effectively utilized as a place in which the take-out opening is formed.

Preferably, the cable reel has a case body accommodating the charging cable. The pull-out opening is formed in the case body. According to the vehicle configured as described, above, a work of further taking out the charging cable pulled out from the case body through the pull-out opening, from the door portion through the take-out opening can be smoothly performed.

Preferably, the pull-out opening and the take-out opening are formed at positions overlapping in an up-down direction. According to the vehicle configured as described above, workability during charging of the vehicle can be further improved.

Preferably, the door portion is a driver-side door opened and closed when a driver gets into and out of the vehicle cabin.

It is expected that, in the vehicle configured as described above, the driver is most likely to perform a charging work using the charging cable. Therefore, load on the driver during the charging work can be reduced by facilitating the driver's access to the charging cable.

Advantageous Effects of Invention

As described above, according to the present invention, a vehicle excellent in workability during charging can be provided.

DESCRIPTION OF EMBODIMENTS

Figure 1:
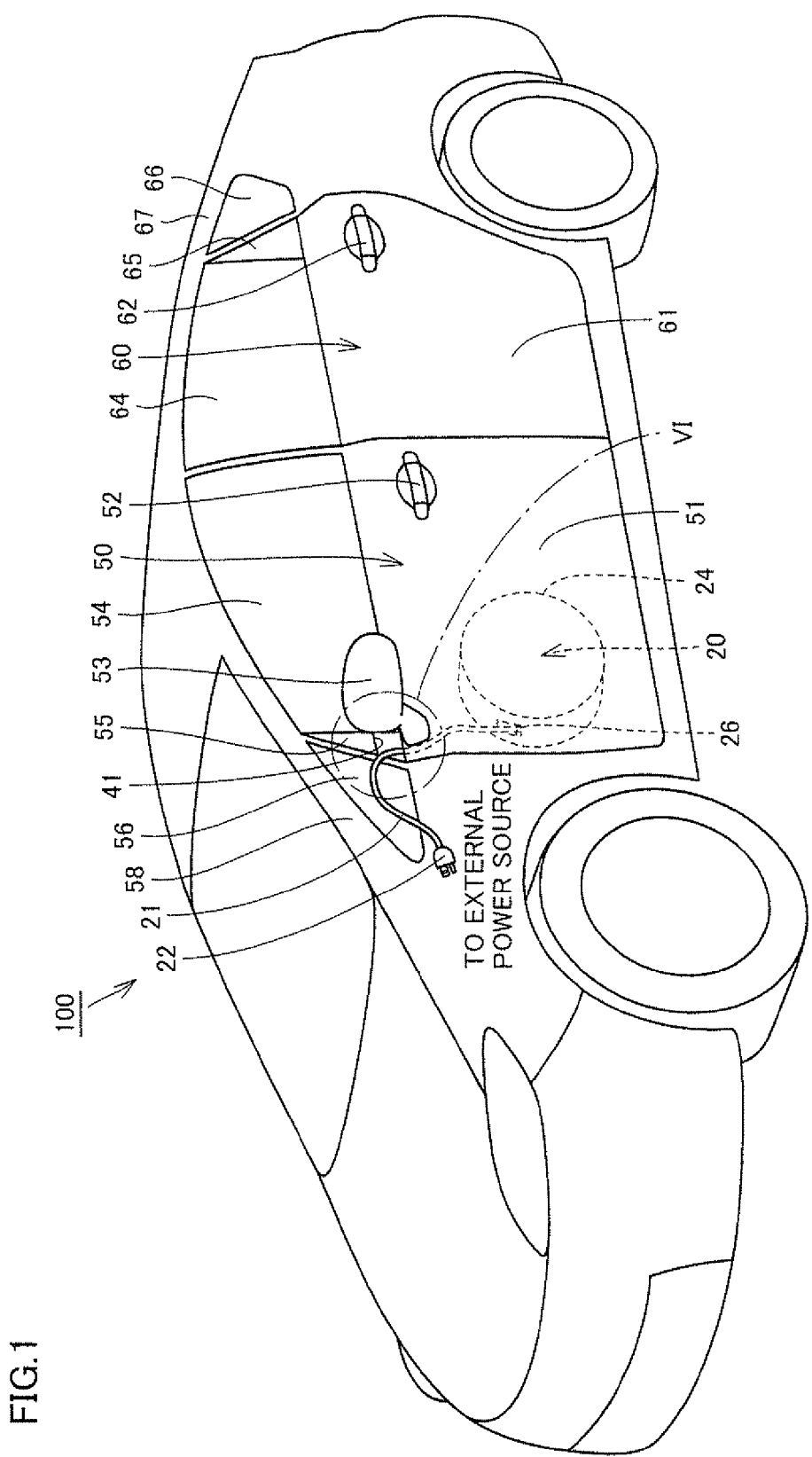
FIG. 1 is a perspective view showing an outer appearance of a hybrid car in Embodiment 1 of the present invention.

Embodiments of the present invention will be described with reference to the drawings. In the drawings referred to below, identical or corresponding members will be designated by the same numerals.

(Embodiment 1)

Figure 2:
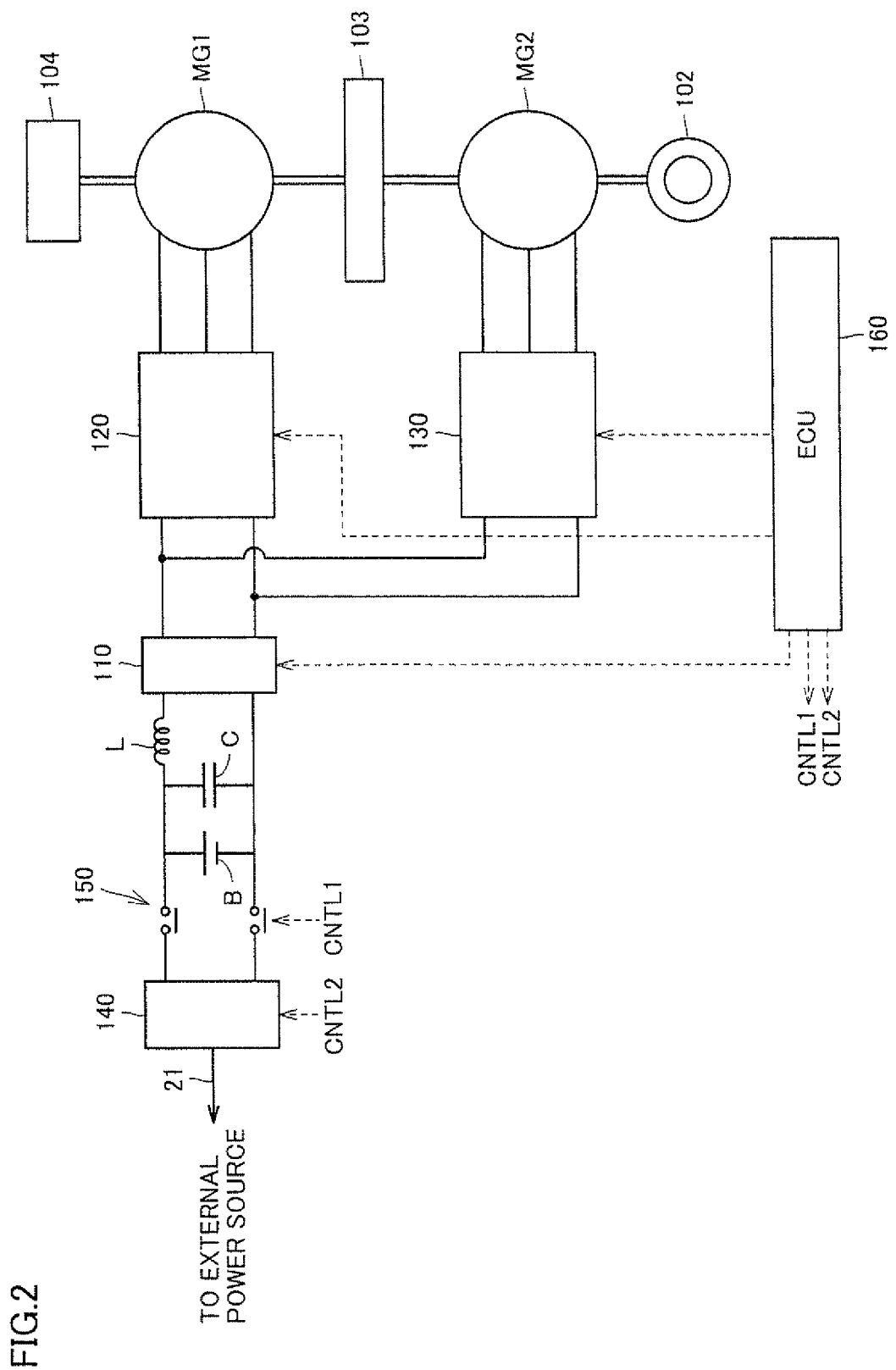
FIG. 2 is a block diagram showing a schematic configuration of the hybrid car in FIG. 1.

FIG. 1 is a perspective view showing an outer appearance of a hybrid car in Embodiment 1 of the present invention. FIG. 2 is a block diagram showing a schematic configuration of the hybrid car in FIG. 1.

Referring to FIGS. 1 and 2, a hybrid car 100 in the present embodiment includes an internal combustion engine such as a gasoline engine or a diesel engine, and a motor to which electric power is supplied from a battery capable of being charged and discharged (i.e., a secondary battery), as motive power sources.

Firstly, an entire configuration of hybrid car 100 will be described. Hybrid car 100 has an engine 104, motor generators MG1, MG2, a motive power split mechanism 103, a battery B, a capacitor C, a reactor L, a converter 110 and inverters 120, 130, and a vehicle ECU (Electronic Control Unit) 160.

Motive power split mechanism 103 is coupled to engine 104 and motor generators MG1, MG2 to split motive power among them. For example, a planetary gear mechanism having three rotation shafts of a sun gear, a planetary carrier, and a ring gear is used as motive power split mechanism 103. These three rotation shafts are connected to rotation shafts of engine 104 and motor generators MG1, MG2. Engine 104 and motor generators MG1, MG2 can be mechanically connected to motive power split mechanism 103, for example by passing a crank shaft of engine 104 through the center of a hollow rotor of motor generator MG1.

The rotation shaft of motor generator MG2 is coupled to wheels 2 by a reduction gear and a differential gear not shown. A decelerator for the rotation shaft of motor generator MG2 may be further mounted within motive power split mechanism 103.

Motor generator MG1 is mounted in hybrid car 100 to operate as an electric power generator driven by engine 104 and operate as a motor that can start engine 104. Motor generator MG2 is mounted in hybrid car 100 as a motor that drives wheels 102 as drive wheels of hybrid car 100.

Motor generator MG1, MG2 is, for example, a three-phase alternating current (AC) synchronous motor. Motor generator MG1, MG2 includes a three-phase coil composed of a U-phase coil, a V-phase coil, and a W-phase coil, as a stator coil.

Motor generator MG1 generates a three-phase AC voltage using an engine output, and outputs the generated three-phase AC voltage to inverter 120. Motor generator MG1 generates a drive force using a three-phase AC voltage received from inverter 120, and starts engine 104.

Motor generator MG2 generates a drive torque for the vehicle using a three-phase AC voltage received from inverter 130. Motor generator MG2 generates a three-phase AC voltage and outputs it to inverter 130 during regenerative braking of the vehicle.

As battery B, for example, a secondary battery such as a nickel hydride battery, a lithium-ion battery, and a lead-acid battery can be used. Further, a large-capacity electric double layer capacitor can also be used instead of battery B.

Hybrid car 100 in the present embodiment is configured such that battery B can be charged by receiving electric power supply from an external power source.

More specifically, hybrid car 100 further has a charging cable 21. Charging cable 21 is formed of a long electric cable, and has a connector 22 at one end. Connector 22 is provided to be connectable to an outlet of the external power source, for example a household power source. By connecting connector 22 to the external power source during a charging work for battery B, electric power is supplied from the external power source to a vehicle main body, through charging cable 21.

Charging cable 21 is electrically connected to battery B via an AC/DC converter 140 and a switching mechanism 150. AC/DC converter 140 converts an AC supplied from the external power source through charging cable 21 into a direct current (DC) to have a prescribed voltage. Switching mechanism 150 is provided between AC/DC converter 140 and battery B. Switching mechanism 150 switches ON/OFF of an energization state between AC/DC converter 140 and battery B based on a signal from vehicle ECU 160.

Figure 3:
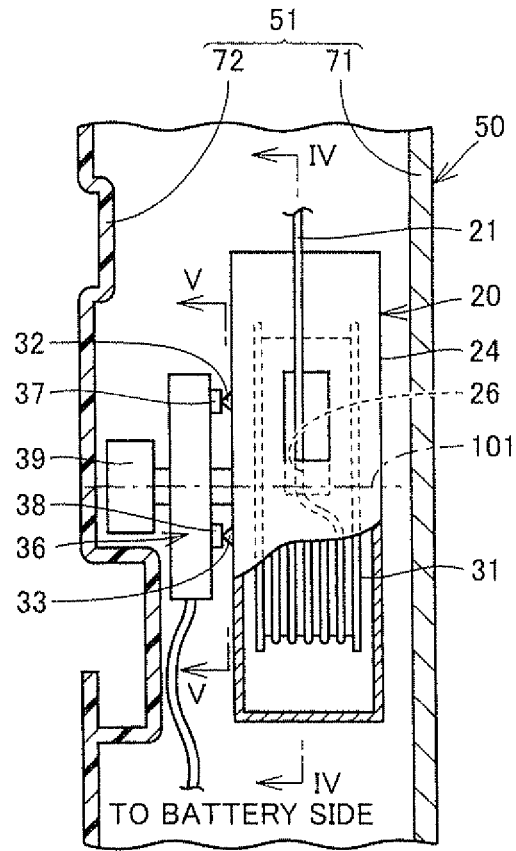
FIG. 3 is a cross sectional view showing a mounting structure for a charging cable provided to the hybrid car in FIG. 1.

Next, a mounting structure for charging cable 21 provided to hybrid car 100 will be described. FIG. 3 is a cross sectional view showing a mounting structure for a charging cable provided to the hybrid car in FIG. 1.

Referring to FIGS. 1 and 3, hybrid car 100 has a front door 50 and a rear door 60. Front door 50 and rear door 60 are provided on a vehicle side surface of hybrid car 100 to be capable of being opened and closed. Front door 50 and rear door 60 are opened and closed when an occupant gets into and out of a vehicle cabin of hybrid car 100. Front door 50 and rear door 60 are arranged adjacent to each other in a front-rear direction of the vehicle, and front door 50 is arranged forward of rear door 60 in the vehicle.

Front door 50 is configured to have a main body portion 51, a window glass 54, and a resin portion 55.

Main body portion 51 is coupled to the vehicle main body via a hinge not shown. Main body portion 51 is provided with a door knob 52 operated when front door 50 is opened, and a door mirror 53 with which a driver checks a rearview. Main body portion 51 has a resin molded portion 72 installed on the inner side of the vehicle cabin, and a steel plate portion 71 installed on the outer side of the vehicle cabin and constituting a side body of hybrid car 100 (see FIG. 3). Resin molded portion 72 and steel plate portion 71 are arranged to be separated from each other. Main body portion 51 has the shape of a bag with a space formed between resin molded portion 72 and steel plate portion 71.

Window glass 54 and resin portion 55 are arranged above main body portion 51. Window glass 54 is provided to be capable of being opened and closed in an up-down direction. In an opened state, window glass 54 is accommodated within main body portion 51.

Resin portion 55 is foraged of resin. Resin portion 55 is arranged forward of window glass 54 in the vehicle, to be adjacent to window glass 54. Resin portion 55 is arranged rearward of a front pillar glass 56 adjacent to a front pillar 58 in the vehicle, to be adjacent to front pillar glass 56. Resin portion 55 is arranged between front pillar glass 56 and window glass 54. Resin portion 55 is a portion covering a region above main body portion 51 where window glass 54 is not arranged. Resin portion 55 is arranged above door mirror 53. Door mirror 53 may be provided to resin portion 55 instead of main body portion 51.

Rear door 60 has a structure substantially identical to that of front door 50, and is configured to have a main body portion 61, a window glass 64, and a resin portion 65. The structure of rear door 60 will be described, mainly regarding differences from front door 50. Main body portion 61 is provided with a door knob 62 operated when rear door 60 is opened. Resin portion 65 is arranged rearward of window glass 64 in the vehicle, to be adjacent to window glass 64. Resin portion 65 is arranged forward of a rear quarter glass 66 adjacent to a rear pillar 67 in the vehicle, to be adjacent to rear quarter glass 66. Resin portion 65 is arranged between rear quarter glass 66 and window glass 64. Resin portion 65 is arranged above door knob 62.

Hybrid car 100 has a cable reel 20 for mounting charging cable 21 in the vehicle.

Cable reel 20 is accommodated within front door 50. More specifically, cable reel 20 is accommodated in an internal space of main body portion 51 formed between resin molded portion 72 and steel plate portion 71.

Figure 4:
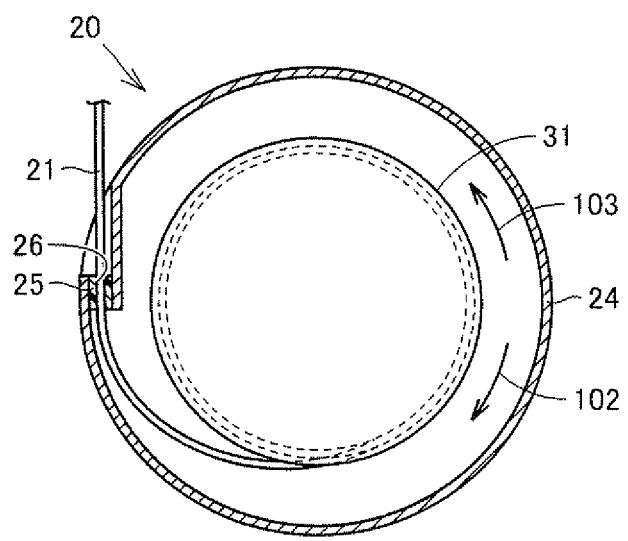
FIG. 4 is a cross sectional view showing a cable reel along a line IV-IV in FIG. 3.

FIG. 4 is a cross sectional view showing the cable reel along a line IV-IV in FIG. 3. Referring to FIGS. 3 and 4, a structure of cable reel 20 will be described. Cable reel 20 is configured to have a cable winding drum 31, a motor 39, a cable accommodation case 24, and a slide portion 36.

Cable winding drum 31 has the shape of a circular cylinder around which charging cable 21 can be wound. Cable winding drum 31 is supported to be rotatable about a central axis 101. To cable winding drum 31, motor 39 for rotatably driving the drum when it takes up charging cable 21 is connected. It is to be noted that the mechanism for rotatably driving cable winding drum 31 is not limited to motor 39, and may be, for example, a mechanism utilizing an elastic force of a spring.

Charging cable 21 is wound around cable winding drum 31 to be capable of being pulled out. Charging cable 21 is wound to be pulled out when cable winding drum 31 is rotated in a direction indicated by an arrow 102 in FIG. 4, and to be taken up when cable winding drum 31 is rotated in a direction indicated by an arrow 103 in FIG. 4.

Cable accommodation case 24 is provided around the outer periphery of cable winding drum 31. Cable accommodation case 24 is provided to cover charging cable 21 wound around cable winding drum 31.

In cable accommodation case 24, a pull-out opening 26 for pulling out charging cable 21 accommodated therein is formed. Pull-out opening 26 is formed as a portion of cable reel 20 which eventually releases charging cable 21 from cable reel 20 toward a take-out opening 41 described later. In the present embodiment, a bush 25 for guiding charging cable 21 is formed in cable accommodation case 24. Bush 25 has a through-hole through which charging cable 21 is inserted, and the through-hole constitutes pull-out opening 26.

Pull-out opening 26 is formed to be directed to resin portion 55 in FIG. 1. In other words, pull-out opening 26 is formed such that an opening of the through-hole constituting pull-out opening 26 faces resin portion 55. Pull-out opening 26 is formed such that resin portion 55 is arranged on a side in a direction in which charging cable 21 inserted through pull-out opening 26 is pulled out.

Figure 5:
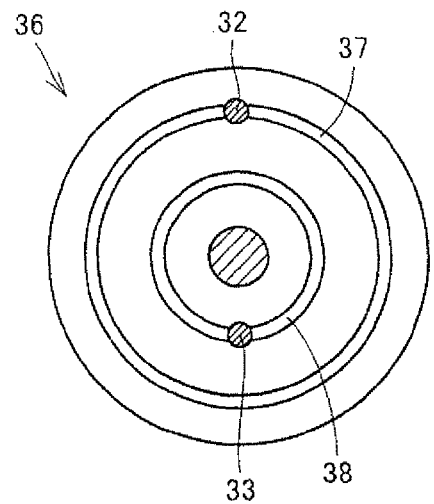
FIG. 5 is a cross sectional view showing the cable reel along a line V-V in FIG. 3.

FIG. 5 is a cross sectional view showing the cable reel along a line V-V in FIG. 3. Referring to FIGS. 3 and 5, slide portion 36 has a function of maintaining electrical connection between battery B on a vehicle main body side and charging cable 21 wound around cable winding drum 31.

Slide portion 36 is arranged to face cable winding drum 31 in an axis direction of central axis 101. Slide portion 36 has conductive portions 37, 38. Conductive portion 37, 38 is formed of a conductive metal, and formed to extend in an annular pattern in a plane perpendicular to central axis 101. Conductive portions 37, 38 are electrically connected with battery B on the vehicle main body side. Cable winding drum 31 is provided with terminal portions 32, 33 in a manner exposed from cable accommodation case 24. Terminal portion 32 and terminal portion 33 are respectively electrically connected to a positive cable and a negative cable constituting charging cable 21. Terminal portion 32 and terminal portion 33 are respectively arranged to be located on the periphery of conductive portion 37 and conductive portion 38 extending in an annular pattern.

With such a configuration, when cable winding drum 31 is rotated, terminal portions 32, 33 rotate about central axis 101 while being in contact with conductive portions 37, 38. Thereby, electrical connection between battery B on the vehicle main body side and charging cable 21 wound around cable winding drum 31 is maintained.

Figure 6:
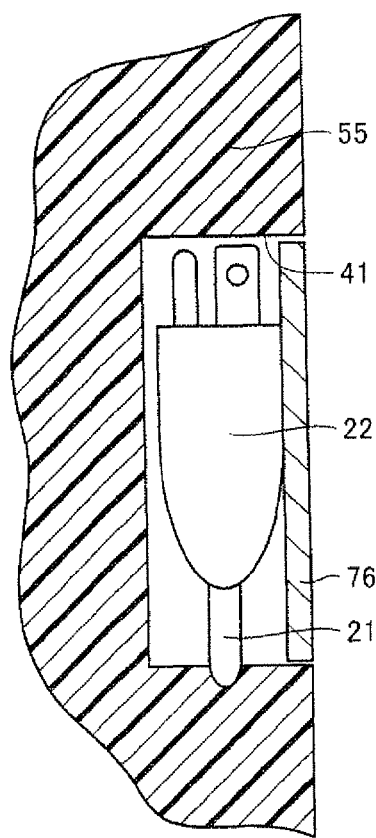
FIG. 6 is a cross sectional view showing a range surrounded by a one-dot chain line VI in FIG. 1.

FIG. 6 is a cross sectional view showing a range surrounded by a one-dot chain line VI in FIG. 1. Referring to FIGS. 1 and 6, take-out opening 41 is formed in resin portion 55. Resin portion 55 is arranged above (i.e., at a position higher than) a position at which cable reel 20 is provided.

Take-out opening 41 is formed of a concave portion in a shape which is concaved from an outer surface of resin portion 55 and can accommodate connector 22. A lid 76 for closing take-out opening 41 is attached to resin portion 55. To charge battery B, an operator removes lid 76, and takes out connector 22. Then, the operator pulls out charging cable 21 from within front door 50 to the outside of the vehicle, through take-out opening 41.

Figure 7:
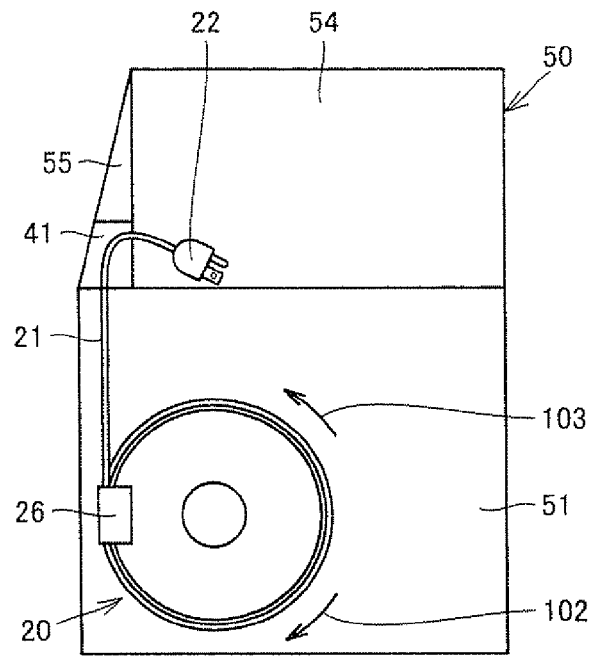
FIG. 7 is a side view schematically showing the mounting structure for the charging cable provided to the hybrid car in FIG. 1.

FIG. 7 is a side view schematically showing the mounting structure for the charging cable provided to the hybrid car in FIG. 1.

Referring to FIG. 7, in hybrid car 100 in the present embodiment, take-out opening 41 for pulling out charging cable 21 from within front door 50 to the outside of the vehicle is formed in resin portion 55 of front door 50 located above cable reel 20. Further, pull-out opening 26 for pulling out charging cable 21 from cable accommodation case 24 within front door 50 is formed to be directed to resin portion 55 in which take-out opening 41 is formed. With such a configuration, take-out opening 41 is arranged at a position to which charging cable 21 pulled out from pull-out opening 26 extends, which can reduce a force required to pull out charging cable 21. This facilitates a work of pulling out charging cable 21.

Further, particularly in the present embodiment, take-out opening 41 is arranged on a line extended from the through-hole constituting pull-out opening 26 in a passing-through direction thereof. Moreover, pull-out opening 26 and take-out opening 41 are arranged to overlap in the up-down direction. Such a configuration allows charging cable 21 to establish communication between pull-out opening 26 and take-out opening 41 with the shortest distance on a straight line, and further facilitates the pulling-out work.

The structure of hybrid car 100 as the vehicle in Embodiment 1 of the present invention described above will now be described in summary. Hybrid car 100 is a vehicle capable of being externally charged through charging cable 21. Hybrid car 100 includes front door 50 as a door portion opened and closed when an occupant gets into and out of a vehicle cabin, and cable reel 20 mounted within front door 50 for taking up charging cable 21. Front door 50 has resin portion 55 as an upper portion located above cable reel 20. Pull-out opening 26 directed to resin portion 55 for pulling out charging cable 21 is formed in cable reel 20. Take-out opening 41 for taking out charging cable 21 pulled out from pull-out opening 26 from front door 50 to the outside of the vehicle is formed in resin portion 55.

According to hybrid car 100 in Embodiment 1 of the present invention configured as described above, the work of pulling out charging cable 21 is facilitated by reducing the force required to pull out charging cable 21. Further, a space on the vehicle can be effectively utilized by arranging cable reel 20 having a large body within front door 50.

Although take-out opening 41 is formed utilizing resin portion 55 provided forward of window glass 54 in the vehicle in the present embodiment, the present invention is not limited thereto, and take-out opening 41 may be formed, for example, in an upper portion of main body portion 51.

Further, the present invention is also applicable to a Fuel Cell Hybrid Vehicle (FCHV) having a fuel cell and a battery (secondary battery) as drive sources, or an Electric Vehicle (EV). In the hybrid car in the present embodiment, the internal combustion engine is driven at an operating point where fuel efficiency is optimal, whereas in a fuel cell hybrid car, a fuel cell is driven at an operating point where power generation efficiency is optimal. In addition, both hybrid cars are basically identical in the use of a battery.

(Embodiment 2)

In the present embodiment, variations of hybrid car 100 in Embodiment 1 will be described.

Figure 8:
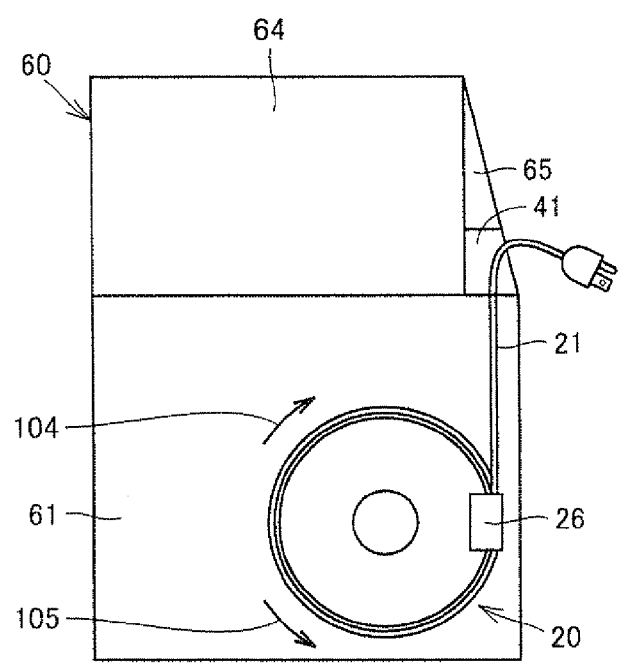
FIG. 8 is a side view showing a first variation of the hybrid car in FIG. 1.

FIG. 8 is a side view showing a first variation of the hybrid car in FIG. 1. FIG. 8 is a view corresponding to FIG. 7 in Embodiment 1.

Referring to FIG. 8, in the present variation, cable reel 20 is mounted within rear door 60. Charging cable 21 is wound to be pulled out when cable winding drum 31 is rotated in a direction indicated by an arrow 105, and to be taken up when cable winding drum 31 is rotated in a direction indicated by an arrow 104. Take-out opening 41 is formed in resin portion 65 of rear door 60 located above cable reel 20. Pull-out opening 26 is formed to be directed to resin portion 65 in which take-out opening 41 is formed.

Figure 9:
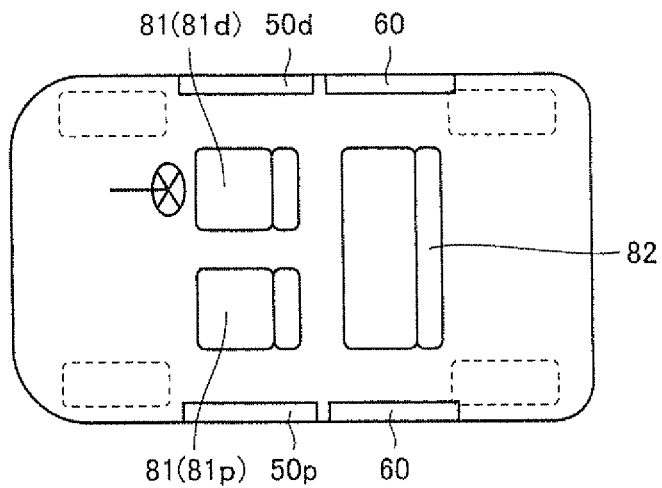
FIG. 9 is a plan view schematically showing a seat layout in the hybrid car.

FIG. 9 is a plan view schematically showing a seat layout in the hybrid car. Referring to FIG. 9, in the vehicle cabin of the hybrid car, a driver seat 81d on which a driver sits and a passenger seat 81p on which a passenger sits (these seats will be referred to as front seats 81 when they are not particularly distinguished), and a rear seat 82 installed behind front seats 81 are provided. A driver front door 50d and a passenger front door 50p are provided at positions adjacent to driver seat 81d and passenger seat 81p, respectively.

Cable reel 20 may be provided in any of driver front door 50d and passenger front door 50p. Most suitably, however, cable reel 20 is provided in driver front door 50d. In this case, since it is expected that the driver is most likely to perform a charging work using charging cable 21, the driver's access to charging cable 21 can be facilitated.

Figure 10:
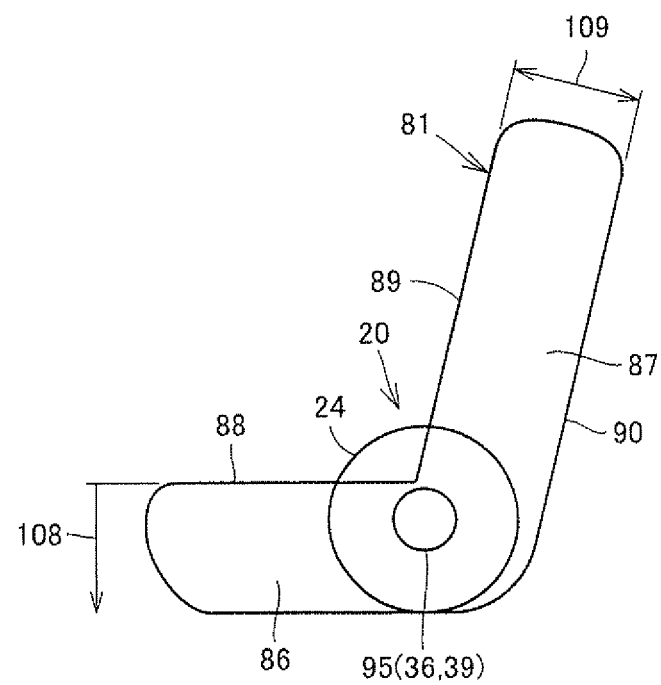
FIG. 10 is a side view showing a second variation of the hybrid car in FIG. 1.

FIG. 10 is a side view showing a second variation of the hybrid car in FIG. 1. Referring to FIG. 10, of various components constituting cable reel 20, motor 39 for rotatably driving cable winding drum 31 and slide portion 36 electrically connecting between battery B on the vehicle main body side and charging cable 21 are formed to include metal components. Motor 39 and slide portion 36 including such metal components constitute a weight portion 95. In the present variation, weight portion 95 is arranged at a position overlapping front seat 81 when front door 50p is viewed from front of the door portion.

According to such a configuration, even if the hybrid car is hit on the side, weight portion 95 can be suppressed from moving toward an occupant sitting on front seat 81.

Front seat 81 includes a seating portion 86 on which the occupant sits, and a backrest portion 87 arranged at the rear of the occupant. More suitably, weight portion 95 is arranged to fit in a range lower than seating portion 86 (i.e., a range indicated by an arrow 108), or a range between a front surface 89 and a rear surface 90 of backrest portion 87 (i.e., a range indicated by an arrow 109).

According to the hybrid car in Embodiment 2 of the present invention configured as described above, the effect described in Embodiment 1 can also be obtained.

It is to be noted that various structures of the hybrid cars in Embodiments 1 and 2 described above may be combined as appropriate to configure a new hybrid car.

It should be understood that the embodiments disclosed herein are illustrative and non-restrictive in every respect. The scope of the present invention is defined by the scope of the claims, rather than the description above, and is intended to include any modifications within the scope and meaning equivalent to the scope of the claims.

Industrial Applicability

The present invention is mainly applicable to a vehicle including a motor to which electric power is supplied from a battery, as a motive power source.

Reference Signs List

20: cable reel, 21: charging cable, 22: connector, 24: cable accommodation case, 25; bush, 26: pull-out opening, 31: cable winding drum, 32, 33: terminal portion, 36: slide portion, 37, 38: conductive portion, 39: motor, 41: take-out opening, 50: front door, 50d: driver front door, 50p: passenger front door, 51, 61: main body portion, 52, 62: door knob, 53; door mirror, 54, 64: window glass, 55, 65: resin portion, 56: front pillar glass, 58: front pillar, 60: rear door, 66: rear quarter glass, 67: rear pillar, 71: steel plate portion, 72: resin molded portion, 76: lid, 81: front seat, 81d: driver seat, 81p: passenger seat, 82: rear seat, 86: seating portion, 87: backrest portion, 89: front surface, 90: rear surface, 95: weight portion, 100: hybrid car

The invention claimed is:

1. A vehicle capable of being externally charged through a charging cable, comprising:
- a door portion opened and closed when an occupant gets into and out of a vehicle cabin;
- a cable reel mounted within said door portion for taking up the charging cable; and
- a seat portion which is installed in the vehicle cabin to be adjacent to said door portion and on which the occupant sits, wherein:
    - said cable reel has a weight portion including a metal component, and
    - said weight portion is arranged at a position adjacent to said seat portion when said door portion is viewed from a side of the vehicle having the door portion,
    - said door portion has an upper portion located above said cable reel,
    - a pull-out opening directed to said upper portion for pulling out the charging cable is formed in said cable reel,
    - a take-out opening for taking out the charging cable pulled out from said pull-out opening from said door portion to outside of the vehicle is formed in said upper portion,
    - said door portion includes:
        - a window glass capable of being opened and closed in an up-down direction,
        - a resin portion installed adjacent to said window glass in a front-rear direction of the vehicle and formed of resin, and
        - a main body portion including a resin molded portion installed on an inner side of the vehicle cabin, and a steel plate portion installed on an outer side of the vehicle cabin, arranged to be separated from said resin molded portion, and constituting a side body of the vehicle, to form an internal space between said resin molded portion and said steel plate portion in which said window glass can be accommodated,
    - said cable reel is mounted in said internal space,
    - said upper portion is said resin portion and said take-out opening is formed in said resin portion, and
    - said pull-out opening is a portion of said cable reel which releases the charging cable from said cable reel toward said take-out opening.

2. The vehicle according to claim 1, wherein
said cable reel has a case body accommodating the charging cable, and
said pull-out opening is formed in said case body.

3. The vehicle according to claim 1, wherein said pull-out opening and said take-out opening are formed at positions overlapping in an up-down direction.

4. The vehicle according to claim 1, wherein said door portion is a driver-side door opened and closed when a driver gets into and out of the vehicle cabin.

* * * * *